(12) United States Patent
Jahn et al.

(10) Patent No.: US 7,806,460 B2
(45) Date of Patent: Oct. 5, 2010

(54) DEVICE FOR ACTUATING AT LEAST ONE PIVOTED EXTERIOR ELEMENT OF A VEHICLE

(75) Inventors: Jorg Jahn, Bunde (DE); Peter Gutendorf, Osnabruck (DE); Ansgar Pellenwessel, Osnabruck (DE)

(73) Assignee: Wilhelm Karmann GmbH, Osnabruck (DE)

( * ) Notice: Subject to any disclaimer, the term of this patent is extended or adjusted under 35 U.S.C. 154(b) by 885 days.

(21) Appl. No.: 10/587,317

(22) PCT Filed: Jan. 26, 2005

(86) PCT No.: PCT/DE2005/000105

§ 371 (c)(1),
(2), (4) Date: Jul. 26, 2006

(87) PCT Pub. No.: WO2005/070716

PCT Pub. Date: Aug. 4, 2005

(65) Prior Publication Data

US 2007/0158972 A1 Jul. 12, 2007

(30) Foreign Application Priority Data

Jan. 26, 2004 (DE) .................... 10 2004 003 954

(51) Int. Cl.
B60J 7/12 (2006.01)
(52) U.S. Cl. .................. 296/107.09; 296/117
(58) Field of Classification Search ............ 296/107.01, 296/107.08, 107.09, 117, 107.17, 112, 115, 296/121, 107.16
See application file for complete search history.

(56) References Cited

U.S. PATENT DOCUMENTS

| 2,632,670 | A | | 3/1953 | Crenshaw | |
|---|---|---|---|---|---|
| 4,749,193 | A | * | 6/1988 | Hacker | 296/107.01 |
| 4,895,409 | A | * | 1/1990 | Konishi et al. | 296/107.2 |
| 5,225,747 | A | * | 7/1993 | Helms et al. | 318/265 |
| 5,772,274 | A | * | 6/1998 | Tokarz | 296/107.09 |
| 6,114,819 | A | * | 9/2000 | Porter et al. | 318/466 |
| 6,334,644 | B1 | | 1/2002 | Gurtler et al. | |
| 6,585,310 | B1 | * | 7/2003 | Guillez et al. | 296/108 |
| 6,663,164 | B1 | * | 12/2003 | Guillez et al. | 296/108 |
| 6,695,385 | B1 | * | 2/2004 | Lange | 296/107.12 |
| 6,722,723 | B2 | * | 4/2004 | Obendiek | 296/107.08 |
| 6,820,917 | B2 | * | 11/2004 | Grubbs | 296/107.17 |
| 6,863,334 | B2 | * | 3/2005 | Dangl et al. | 296/107.09 |
| 7,100,964 | B2 | * | 9/2006 | MacNee, III | 296/117 |
| 7,150,491 | B2 | * | 12/2006 | Perakis | 296/107.2 |
| 7,309,099 | B2 | * | 12/2007 | Netzel et al. | 296/108 |
| 7,377,573 | B2 | * | 5/2008 | Queveau et al. | 296/107.08 |
| 7,441,825 | B2 | * | 10/2008 | Queveau et al. | 296/107.16 |

(Continued)

FOREIGN PATENT DOCUMENTS

DE 199 32 500 A1 2/2001

*Primary Examiner*—Glenn Dayoan
*Assistant Examiner*—Gregory Blankenship
(74) *Attorney, Agent, or Firm*—Gifford, Krass, Sprinkle, Anderson & Citkowski, P.C.; Douglas L. Wathen

(57) ABSTRACT

An apparatus is provided for the actuation of at least one pivotable external element of a vehicle, in particular of a top element of a convertible vehicle, with at least one pivot joint and a drive. The drive may be an electric motor which introduces a drive torque directly into the at least one pivot joint.

29 Claims, 16 Drawing Sheets

U.S. PATENT DOCUMENTS

| | | | |
|---|---|---|---|
| 7,513,563 B2 * | 4/2009 | Guillez et al. | 296/121 |
| 2001/0008345 A1 * | 7/2001 | Stolle et al. | 296/107.01 |
| 2002/0135201 A1 * | 9/2002 | Liedmeyer et al. | 296/107.17 |
| 2005/0242616 A1 * | 11/2005 | MacNee et al. | 296/117 |
| 2006/0038427 A1 * | 2/2006 | MacNee, III | 296/117 |
| 2006/0255620 A1 * | 11/2006 | MacNee et al. | 296/121 |

* cited by examiner

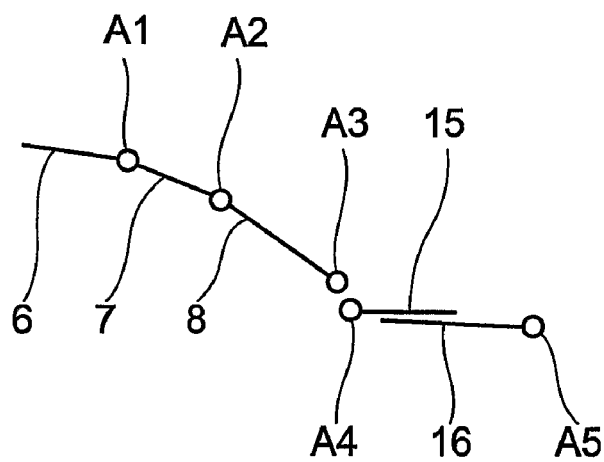
Fig. 8.1
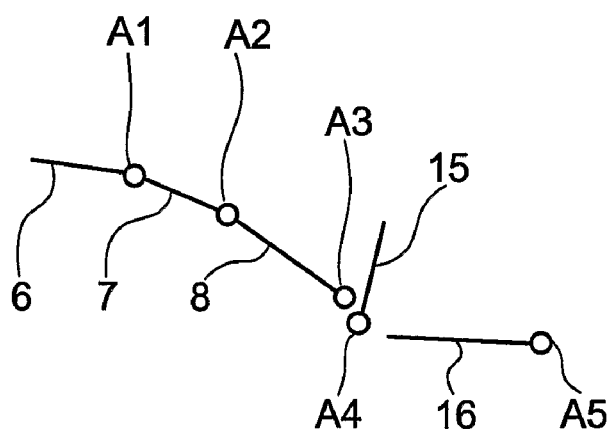
Fig. 8.2
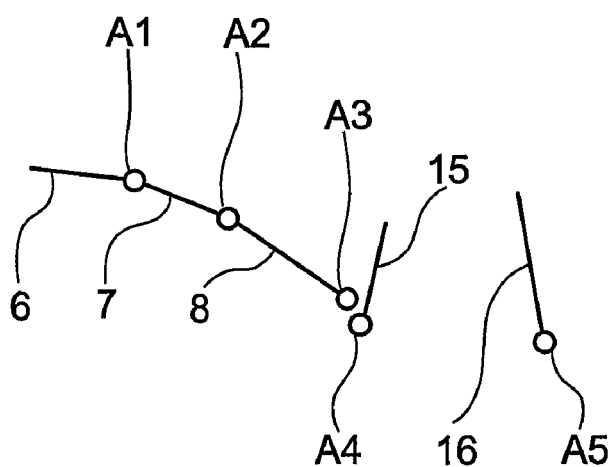
Fig. 8.3

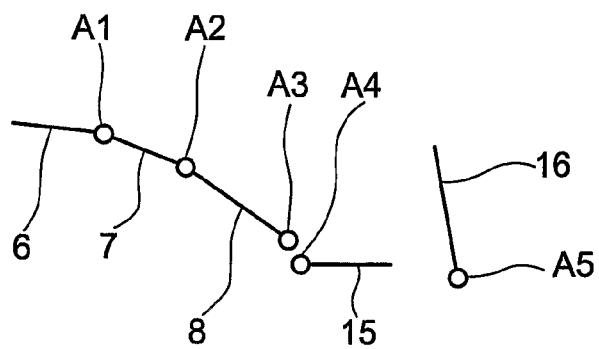
Fig. 8.4
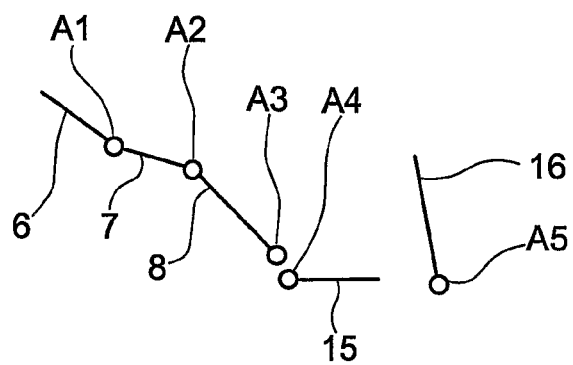
Fig. 8.5
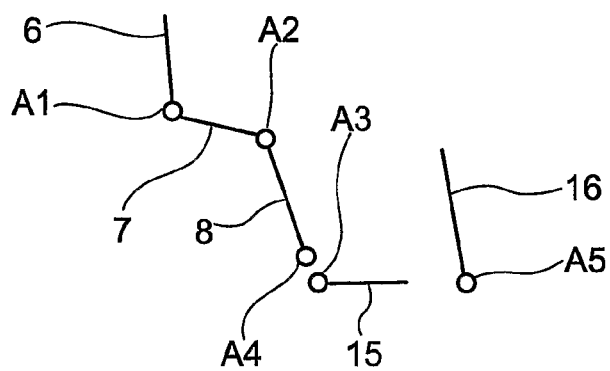
Fig. 8.6
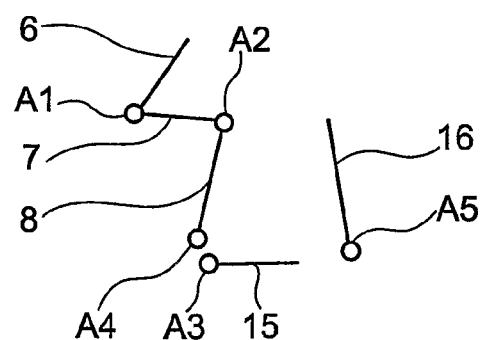
Fig. 8.7

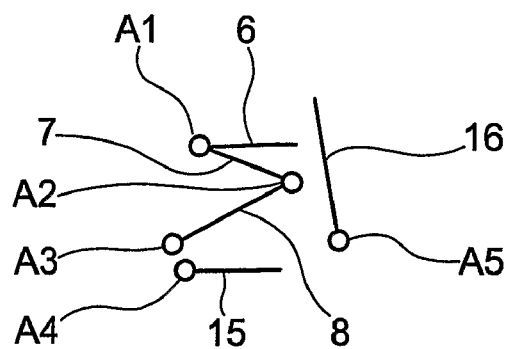
Fig. 8.8
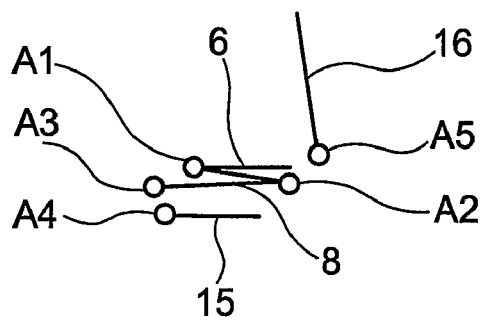
Fig. 8.9
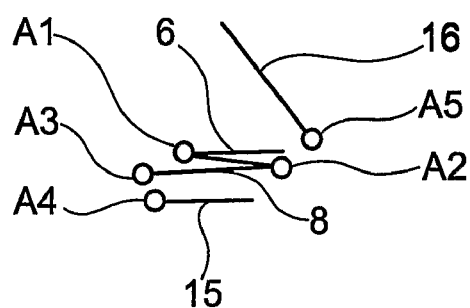
Fig. 8.10
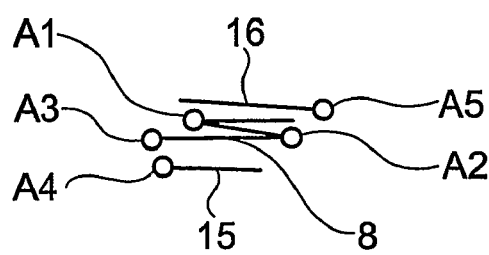
Fig. 8.11

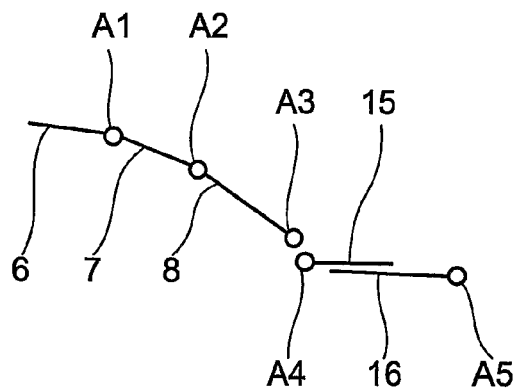
Fig. 9.1
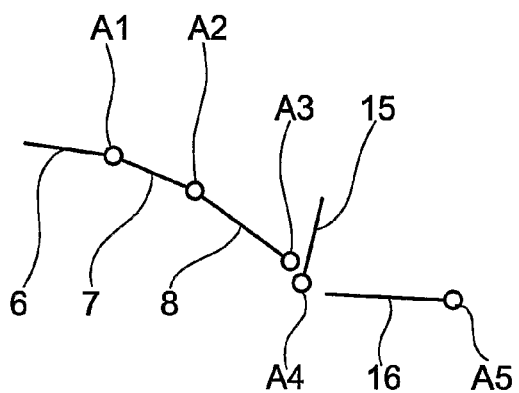
Fig. 9.2
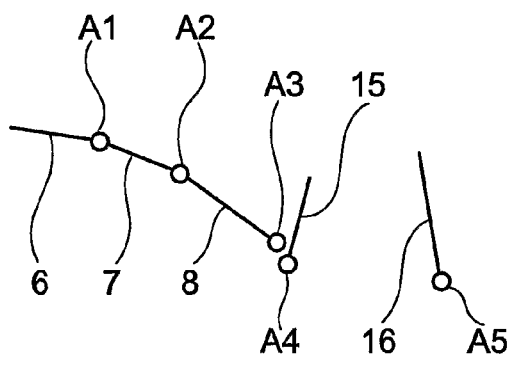
Fig. 9.3
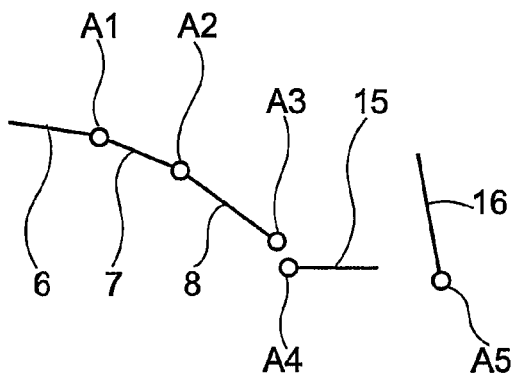
Fig. 9.4

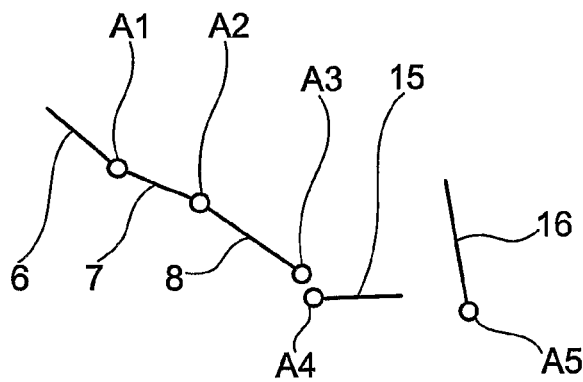
Fig. 9.5
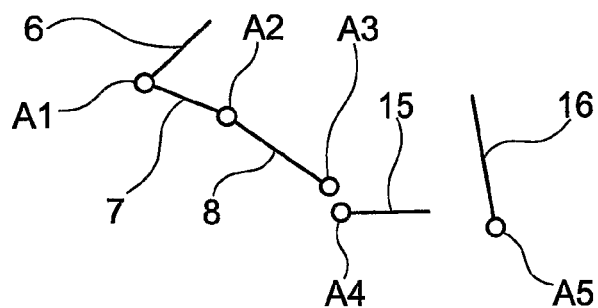
Fig. 9.6
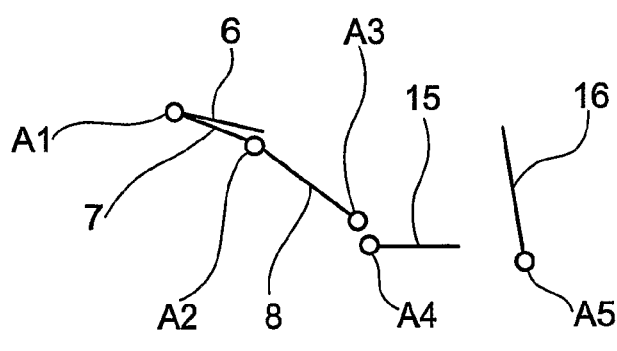
Fig. 9.7
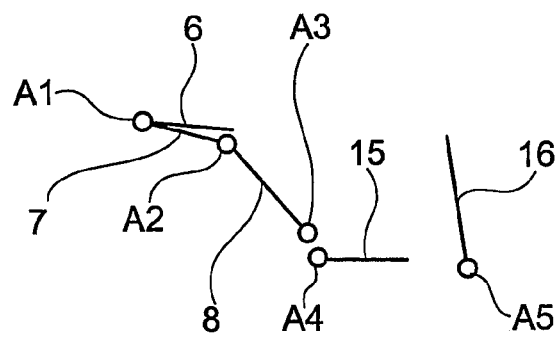
Fig. 9.8

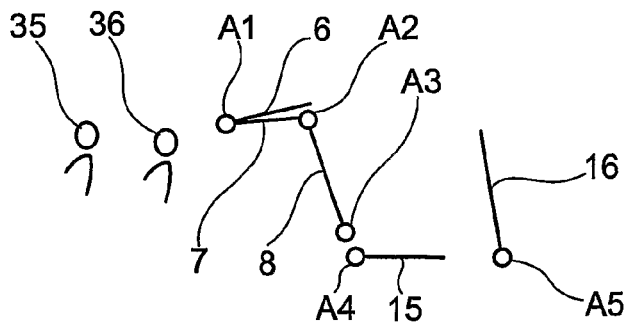
Fig. 9.9
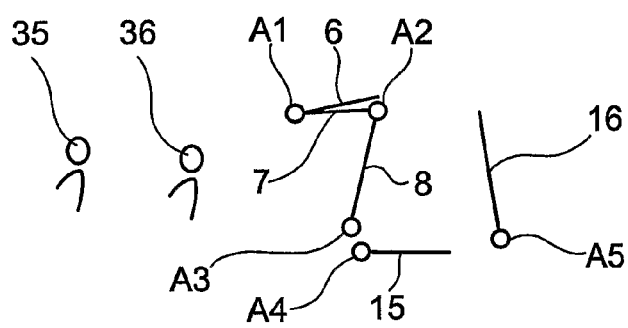
Fig. 9.10
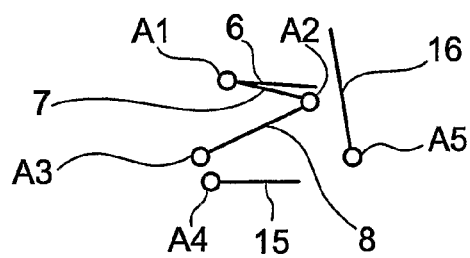
Fig. 9.11
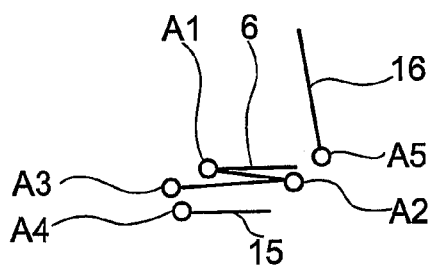
Fig. 9.12
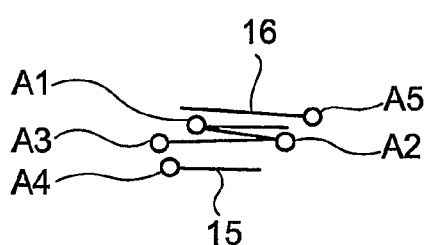
Fig. 9.13

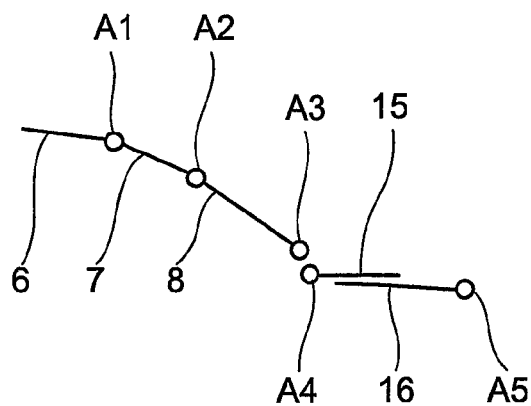
Fig. 10.1
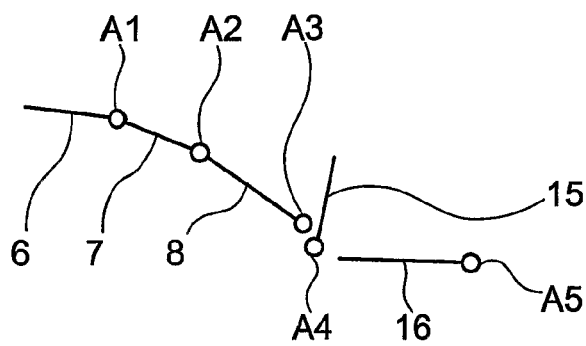
Fig. 10.2
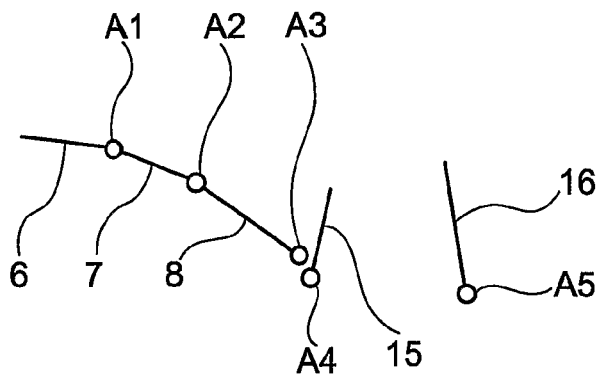
Fig. 10.3
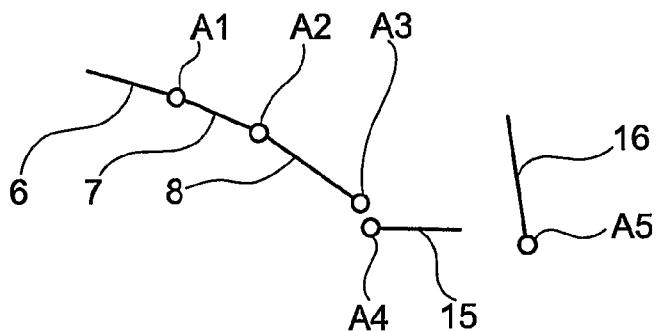
Fig. 10.4

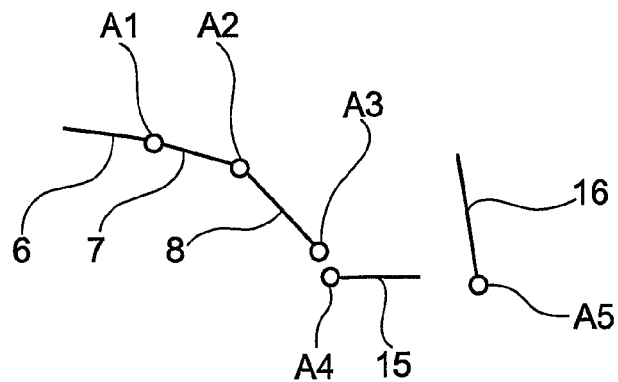
Fig. 10.5
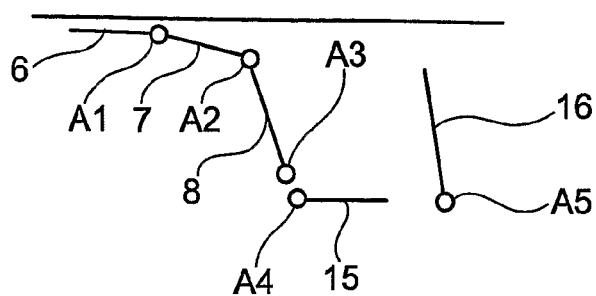
Fig. 10.6
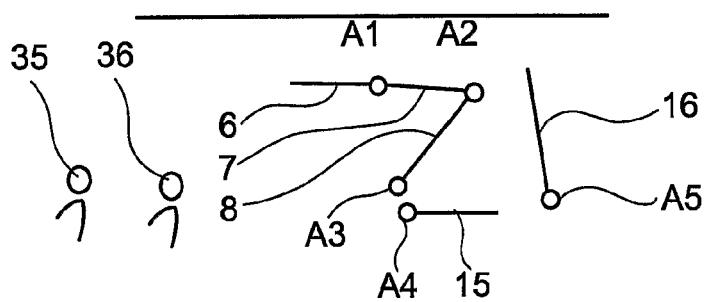
Fig. 10.7
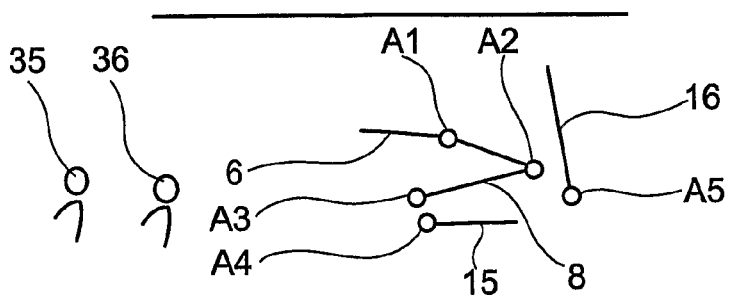
Fig. 10.8

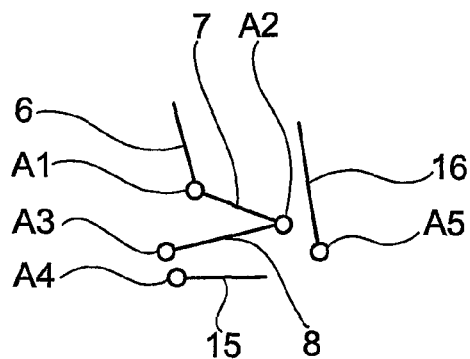
Fig. 10.9
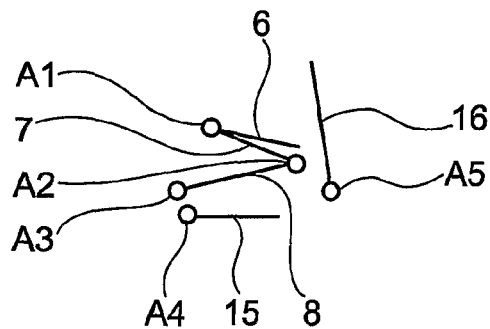
Fig. 10.10
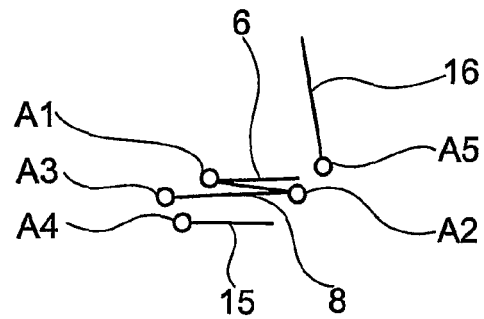
Fig. 10.11
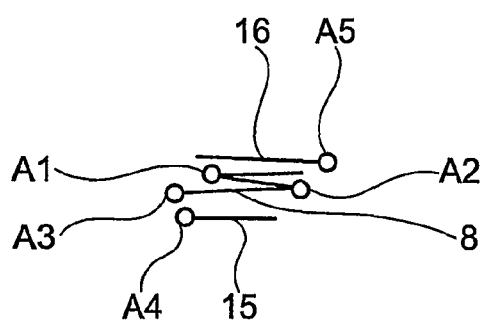
Fig. 10.12

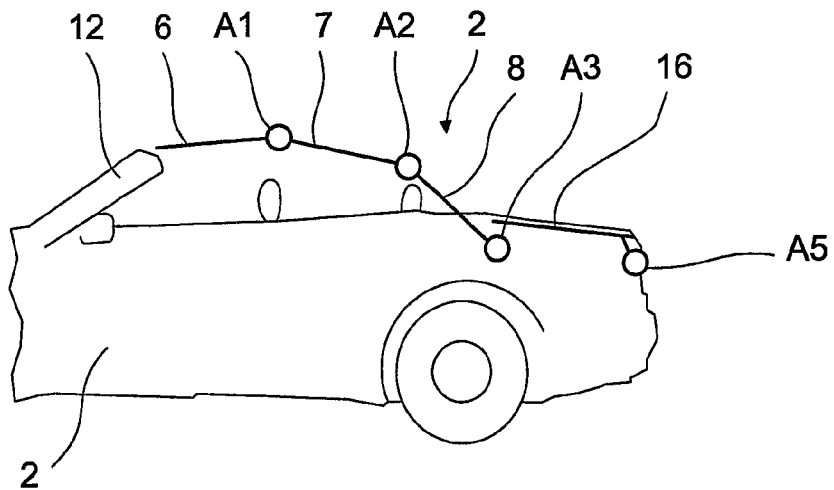
Fig. 11.1
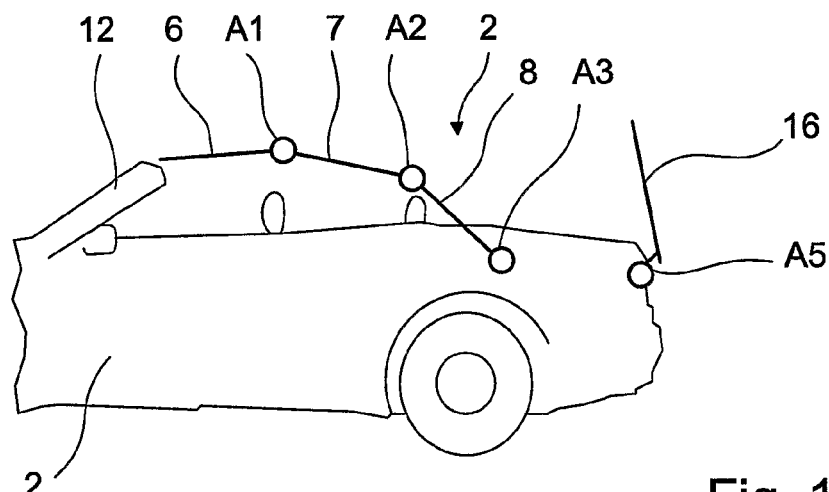
Fig. 11.2
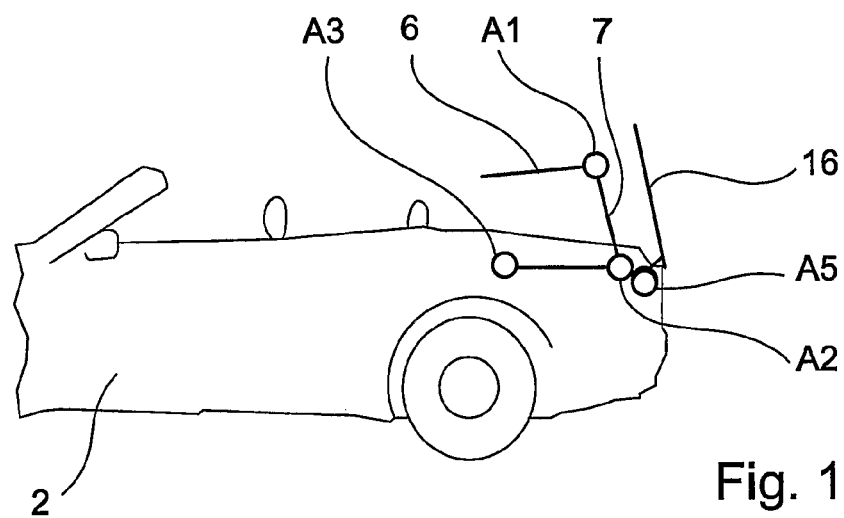
Fig. 11.3

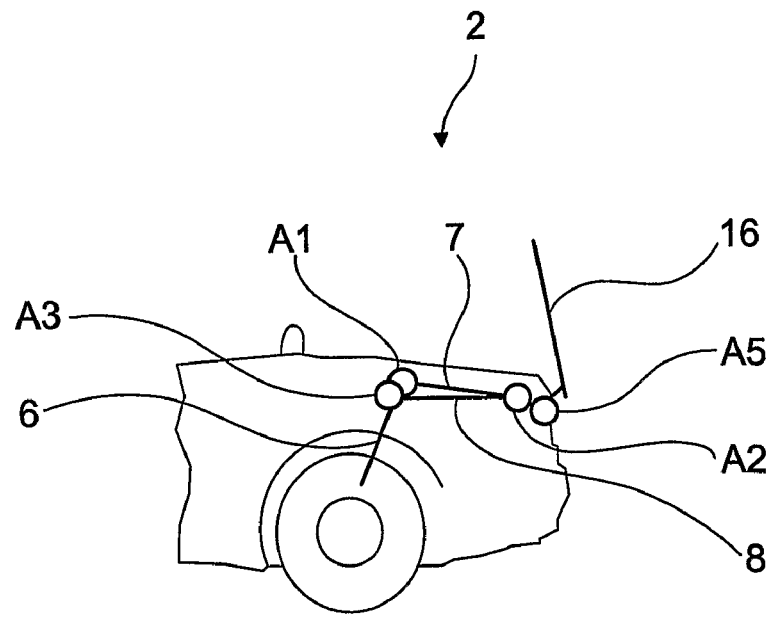
Fig. 11.4
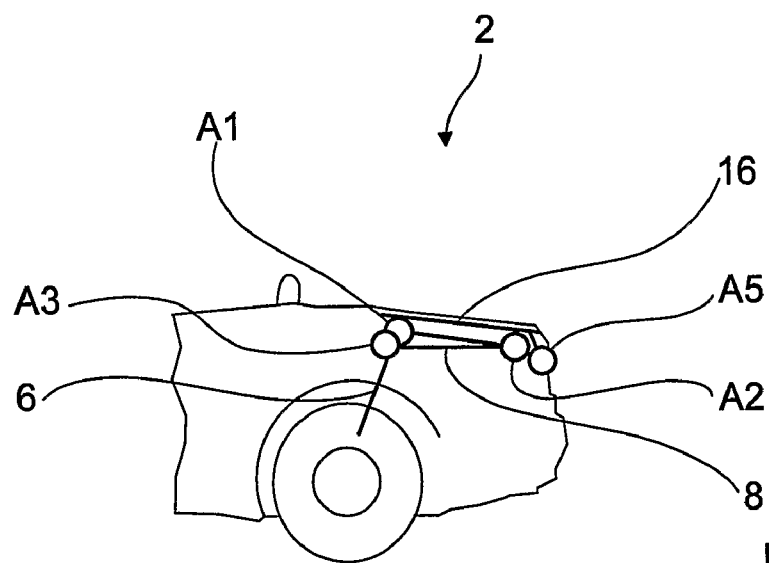
Fig. 11.5

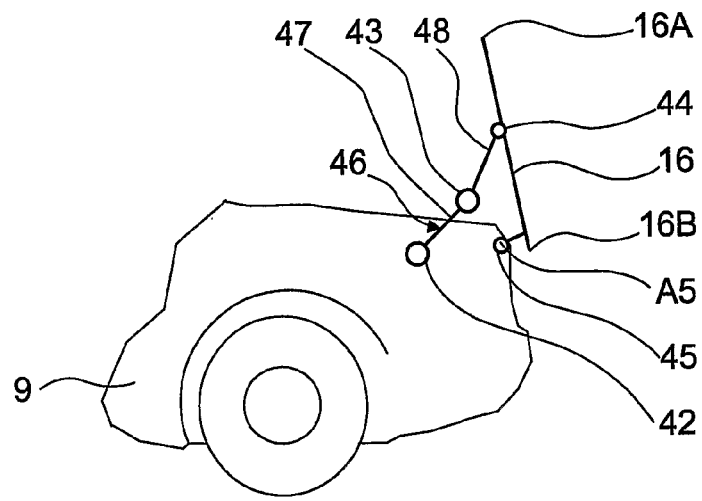
Fig. 12.1
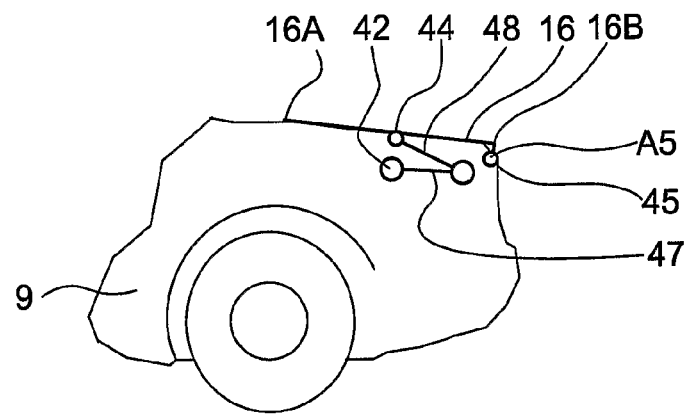
Fig. 12.2
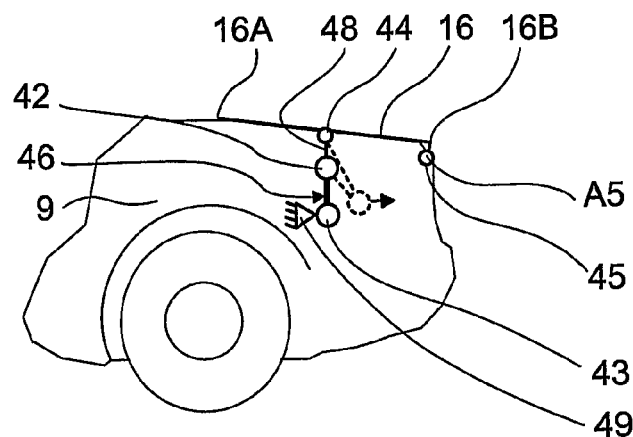
Fig. 12.3

DEVICE FOR ACTUATING AT LEAST ONE PIVOTED EXTERIOR ELEMENT OF A VEHICLE

FIELD OF THE INVENTION

The invention relates to an apparatus for the actuation of at least one external element of a vehicle, in particular of a top element of a convertible vehicle, of the type defined in more detail in the preamble of claim 1.

BACKGROUND OF THE INVENTION

The actuation of automatically pivotable external elements of a vehicle, which in particular represent top elements of a convertible vehicle and tailgate or trunk covers, but which can also be made as other external parts of a vehicle such as a gas tank cover or a door element, typically takes place in practice by fluid drives in the form of hydraulic cylinders which are hinged at one end to the vehicle body and at the other end to the external elements of the vehicle to be pivoted.

In addition to the disadvantages typically inherent in hydraulic systems with respect to the temperature behavior and to the servicing effort as well as to the typically high construction space requirements, the limited flexibility with respect to the design of the path of movement of the external element of the vehicle is disadvantageous on the use of a hydraulic drive for the pivoting of an external element of a vehicle.

It is known to move a top or a top storage well cover of a convertible vehicle using an electrical drive. In this connection, linear drives are used which are designed as replacements for a hydraulic control for the corresponding use, with the linear motion generated by an electric motor being transmitted to the at least one pivotable external element of the vehicle via a suitable multi-joint mechanism. Such a drive for a pivotable external element of a vehicle is thus complex.

The aforesaid disadvantages have a particularly serious effect on the actuation of a plurality of pivotable external elements of a vehicle such as are represented, for example, by the top elements of a convertible vehicle. With convertible vehicles whose top is stored in a folded or folded together manner, and usually in a storage well in the rear sector of the vehicle, in the open state, there is the problem of realizing a top movement between its end positions with a top which is as light as possible and with simple kinematics, with a sufficient height having to be taken into account with respect to the head area of vehicle occupants, on the one hand, and with a height having to be taken into account which is as low as possible with respect to possible spatial boundaries such as a garage roof, on the other hand, in the design of the paths of movement of the cover.

The roof elements of a top are typically driven for this purpose via a top linkage which is connected to a body via a main bearing and establishes a transmission of force, hydraulically via joints as a rule, from the drive motor up to a front end of the top.

Although the movement sequences for a clamp, a top storage well cover and the top mechanism can be designed separately per se, a compulsory control via the hydraulic drive is usually provided in the top mechanism, so that the individual joints of the top linkage cannot be controlled separately.

The German patent specification DE 198 47 983 C1 describes a multi-part, lowerable vehicle top which provides the possibility of controlling a plurality of top elements independently of one another. For this purpose, a multipart, lowerable vehicle top having at least two flexurally rigid top elements, which are pivotally connected to one another and are pivotally connected to the vehicle body via at least one top element, are designed such that hinge joints are provided for the connection of the at least two flexurally rigid top elements to one another and to the vehicle body, with at least one of the hinge joints per connection being able to be driven by means of a fluid drive.

In this known solution, a conventional transmission linkage is replaced by a complex mechanism having a plurality of hydraulic drives. In addition to the required construction effort and to the requirement of a separate hydraulic pump for each hinge point to be able to control different hinge points with independent volume flows and to a correspondingly high weight of the top, the speed of the top movement is restricted by the disadvantages of a hydraulic drive inherent in the system. These disadvantages include the high temperature dependency, the restrictions in the speed regulation due to the comparatively low stiffness of hydraulic systems and their dead times as well as a poor efficiency.

SUMMARY OF THE INVENTION

It is therefore an object of the present invention to provide an apparatus for the actuation of at least one pivotable external element of a vehicle, in particular of a top element of a convertible vehicle, of the type initially described in more detail which is improved with regard to a simple, flexibly designed and faster movement sequence in the pivoting of the at least one external element of a vehicle, to a simpler design and to a lower weight.

This object is solved in accordance with some embodiments of the present invention.

If an apparatus for the actuation of a plurality of pivotal external elements of a vehicle, which are top elements of a top for a convertible vehicle and comprise at least foldable roof elements, with at least one pivot joint and drive being provided for the pivoting of the top elements with respect to one another and with respect to the vehicle body, is designed in accordance with the invention such that an electric motor is provided as the drive for pivot joints of connections between the top elements with respect to one another, said electric motor introducing a drive torque directly into a pivot joint, with in each case at least one pivot joint of different connections being controllable separately, this has the advantage that a much faster movement sequence can be realized due to the avoidance of system-caused dead times of a hydraulic drive and its lower stiffness.

Any desired flexible paths of movement can advantageously be realized by the use of drivable pivot joints which can be used as supporting pivot joints. Paths of movement can be realized with a drive in accordance with the invention which both satisfy the demands for sufficient headroom for passengers, e.g. in the back, and provide a protection against damage by an adjustable distance with respect to a height obstacle such as a garage celling.

A further advantage is provided by some embodiments of the present invention having a drive for a pivotable external element of a vehicle which allows comfort functions. For example, an automatic unit may be adapted to the spatial environmental conditions, optionally determined via a suitable sensor system, and by means of which a top automatically closes or opens under predefined environmental conditions or events such as rain.

The top movement may be ideally adapted to the available headroom, for example, by a distance sensor system and associated control modes stored in the central electrical control unit.

Furthermore, the actuation of the at least one pivotable external element of a vehicle is possible via a remote control, which—with respect to a top—includes the folding open of only one front roof element and thus the creation of a targa-like open top.

The provision of an electric motor as the drive for the at least one pivot joint furthermore has the advantage that, using the motor current of the associated joint drive, a simple possibility of a jamming recognition is provided. The top may be stopped or a reversible top movement may be to initiated for a top with a low reaction time and thus a high jamming protection is possible. Furthermore, a simplified location of the problem area is possible in this manner.

Furthermore, possibilities of an emergency actuation or of a self-locking can also be provided.

Electric motors represent cost-favorable, simple and compact components which can be designed with low construction space requirements with the required motor forces and which can be used universally for different pivot joints and different pivotable external elements of a vehicle or sub-assemblies thereof.

Furthermore, they provide all the possibilities for the control and regulation of the drives corresponding to the desired independent movements of the hinge points or pivot joints independently of the ambient temperatures, they are low in noise and they have a low maintenance requirement.

In an advantageous embodiment, an electric motor is associated with each connection of the top elements to one another or to the vehicle body via a pivot axle. In this manner, the highest flexibility can be realized with respect to an independent movement of the individual top elements.

In embodiments differing from this, it is, however, also conceivable that an electric motor is not associated with each pivot axle, but that one drive is used for more than one pivot axle. In practice, pivot axles, in particular pivot axles with an almost synchronous movement sequence, can be coupled in a simple manner, with a splitting of the drive of an electric motor to two or more rotating shafts being conceivable, or a compulsory guiding of one of the pivot axles.

If one electric motor is associated with a plurality of pivot axles, substantial cost advantages and a clear reduction in the construction space requirements can be achieved.

In a further aspect of the invention, provision can be made for a connection of the top elements to one another or to the vehicle body to be formed by at least one controllable pivot joint and at least one passive pivot joint, with the associated pivot axle of the connection being a pivot axle of a passive pivot joint. When active pivot joints, which represent a direct driven connection between two parts, and passive pivot joints, which can e.g. be formed by one rivet connection and only form one pivot axle, are used, a connection between two top elements or between a top element and the vehicle body can be designed such that the active pivot joint does not engage directly at the pivot axle of the connection, but rather effects the rotation hereat, for example, by means of an auxiliary lever, such that the active pivot joint only has to withstand the required torque and not the further forces occurring at the pivot point of the connection. The active pivot joint in an aspect of this type thus forms a drive for a passive pivot joint forming the actual pivot axle of the connection.

Provision can be made with respect to the control of a pivotable external element of a vehicle or of a top element for a plurality of electric motors to be connected to a central electrical control unit.

Differing from this or complementary to this, at least some of the electric motors used can, however, each have their own control unit which is in each case connected to at least one further control unit for at least one electric motor by a data bus, e.g. a CAN bus of an on board network of the vehicle.

A number of alternatives are possible with regard to the arrangement of the electric motors, with the electric motors being able to be arranged centrally on the longitudinal axis of the vehicle or decentralized with respect to the longitudinal axis of the vehicle with external elements of a vehicle pivotable in the longitudinal direction of the vehicle depending on the package design.

Depending on the arrangement of the electric motors, the shafts which lead from the electric motors to pairs of pivot joints and which are preferably flexible, are to be designed with regard to their torsion resistance such that different lengths from the electric motor to the pivot joint have no effect on the synchronization of pivot joints oppositely arranged.

The apparatus in accordance with the invention is also particularly advantageous when the external element of a vehicle to be pivoted is a cover element which can be raised from a closed position at least at one edge by pivoting by means of at least one drivable pivot joint and at least one associated drive around an oppositely disposed edge. Cover elements of this type may be a trunk lid or a top rear storage well cover or a rear cover of the vehicle combining these two functions.

It is frequently wished to design a pivot joint which serves for the fixing of the cover element to the vehicle body at the edge associated with the pivot axle of the cover element in as space-saving a manner as possible. It is particularly advantageous in this respect for the at least one drivable pivot joint to engage at a linkage which, at one end, is hingedly fixed to the vehicle body and which, at the other end, is hingedly fixed to a region of the cover element disposed spaced apart from a pivot axle of the cover element in the longitudinal direction of the vehicle.

In this manner, the at least one drivable pivot joint is moved out of the region of the hinged connection to the vehicle body such that it can be designed with the lowest construction space requirements, for example with a swan neck bearing.

The region of the hinged connection can also be made as a water passage due to the spatial distance of the at least one drivable pivot bearing from the passive hinged connection of the cover element to the vehicle body without additional measures having to be taken as a result for the protection of electrical components against moisture.

Provision can furthermore be made for the linkage to be formed with the at least one active pivot joint from two mutually connected levers which are of different length, with the cover element being latchable in its closed position by pivoting of the linkage into an over-center position. With such a pivoting capability of the linkage, a locking possibility is created without any additional latching means since the cover element can no longer be opened in the over-center position.

Further advantages and advantageous aspects of the subject matter of the invention can be seen from the description, the drawing and the claims.

BRIEF DESCRIPTION OF THE DRAWINGS

A plurality of embodiments of an apparatus in accordance with the invention are shown in schematically simplified form in the drawing and will be explained in more detail in the following description.

FIGS. 8.1 to 8.11 are schematic positional sketches of the roof elements of the top of FIG. 1 during a first movement sequence for the top opening;

FIGS. 9.1 to 9.13 are schematic positional sketches of the roof elements of the top of FIG. 1 during a second movement sequence for the top opening;

FIGS. 10.1 to 10.12 are schematic positional sketches of the roof elements of the top of FIG. 1 during a third movement sequence for the top opening;

FIGS. 11.1 to 11.5 are schematic positional sketches of the roof elements of the top of FIG. 1 during a fourth movement sequence for the top opening; and FIGS. 12.1 to 12.3 are schematic positional sketch of a top storage well cover during a movement sequence between an open position of the top storage well cover and a locked closed position.

DETAILED DESCRIPTION OF THE PREFERRED EMBODIMENTS

Figure 1:
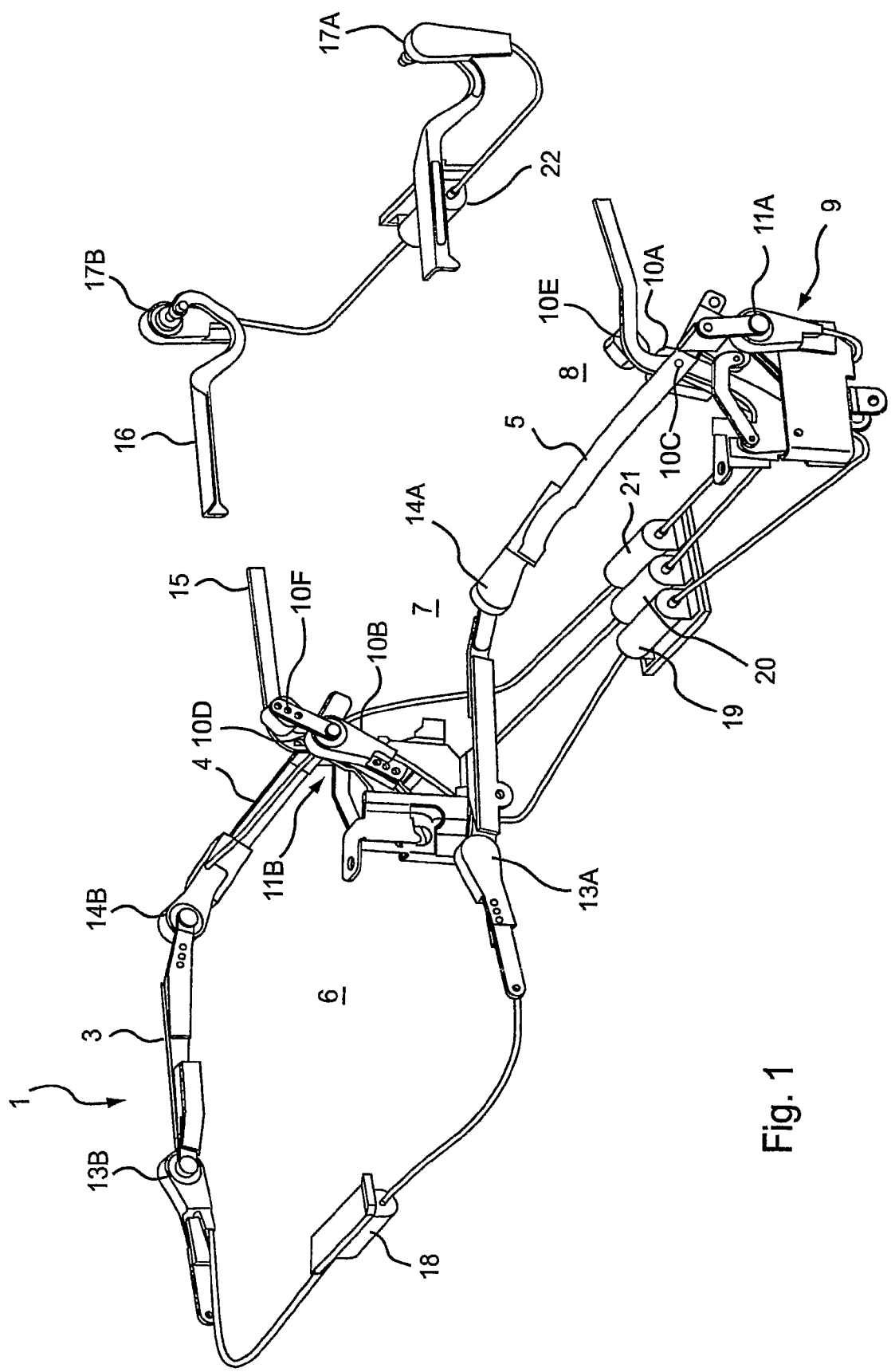
FIG. 1 is a simplified, three-dimensional view of a top for a convertible vehicle, shown alone, with the top being in the closed position.

In the embodiments of an apparatus in accordance with the invention described in the following, the apparatus actuates a pivotable external element of a vehicle, such as a top element of a top element of a top 1 of a convertible vehicle 2.

The convertible vehicle 2 which is designated overall as 2 and is shown in more detail in FIGS. 11.1 to 11.5 and has three foldable roof elements 6, 7, 8 which are bounded by external roof frame section pairs 3, 4, 5 which are oppositely disposed with respect to a longitudinal axis of the vehicle.

The top 2 shown in the Figures is in each case a so-called hard-top folding roof having a front roof element 6 which is adjacent to a windshield frame 12 in the closed state, a middle roof element 7 and a rear roof element 8.

The following embodiments, however, equally apply to a top having a textile roof skin which is fixedly stretched over bending-resistant, frame-like roof elements since frame-like roof elements of this type correspond to the above-described bending-resistant roof elements 6, 7, 8.

As can be seen from FIG. 1, the rear roof element 8 bounding the top 2 at the rear is connected to the vehicle body at a main bearing 9 pivotably at two symmetrically arranged hinge points by means of pivot joints 11A, 11B arranged there.

The connection of the roof elements 6, 7, 8 to one another is likewise in each case made by means of pivot joints, with a pair of two pivot joints 13A, 13B being provided at a first pivot axle A1 between the front roof segment 6 and the middle roof segment 7 and a further pair of two pivot joints 14A, 14 arranged symmetrically to the longitudinal axis of the vehicle being provided at a second pivot axle A2 between the middle roof segment 7 and the rear roof segment 8.

Furthermore, a clamp 15 of the top 2 is pivotably connected to the vehicle body in the region of the main bearing 9 via pairs of pivot joints 10A, 10B, 10C, 10D, 10E and 10F. A top storage well cover 16 is arranged at the rear end of the top 2 and covers a stowage space for the top 2 in its opened state. The top storage well cover 16 is pivotably connected to the vehicle body via two pivot joints 17A, 17B attached to its end at the rear side. The clamp 15 and the cover 16 both represent pivotable external elements of the vehicle.

In the present case, a separately controllable drive, which is in each case made as an electric motor 18, 19, 20, 21, 22 connected to a central electric control unit, is provided for each pivot axle A1, A2, A3 of the roof elements 6, 7, 8 and for the pivot axle A4 of the clamp 15 and the pivot axle A5 of the top storage well cover 16.

The torque of the electric motors 18 to 22 can be introduced in the embodiment of the invention shown into the pivot joints 10A, 10B, 11A, 11B, 13A, 13B, 14A, 14B, 17A, 17B made in the same construction here in each case by means of flexible shafts 23.

In the embodiment shown, all the electric motors 18, 19, 20, 21, 22 are connected to a central control unit which controls or regulates the electric motors 18, 19, 20, 21, 22.

Figure 2:
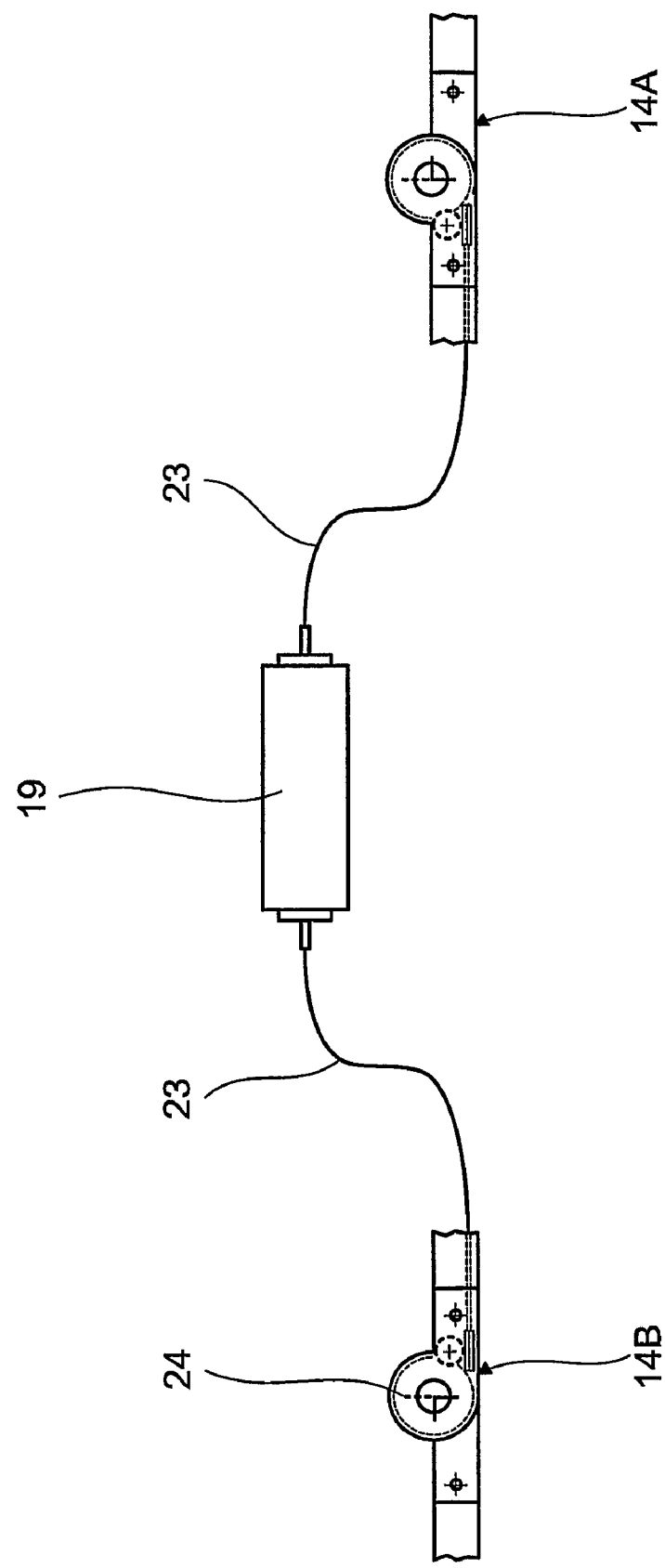
FIG. 2 is a simplified plan view of an electric motor and two pivot joints of a roof element of the top in accordance with FIG. 1 in active connection therewith.
Figure 3:
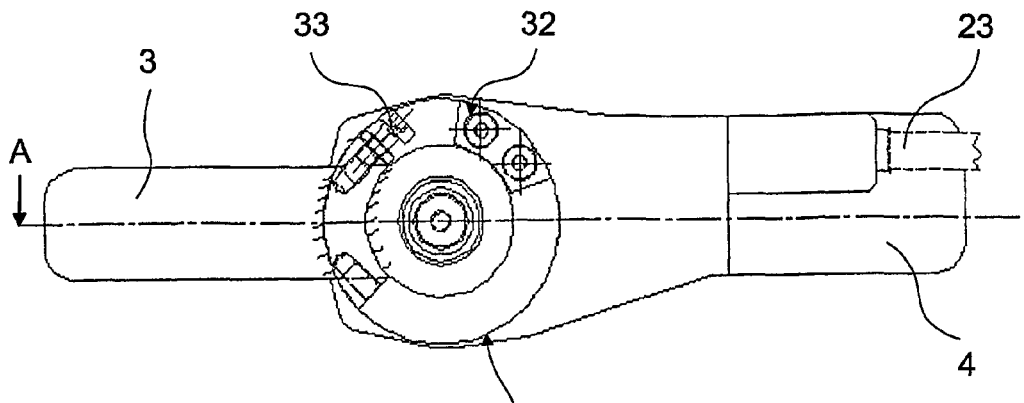
FIG. 3 is a simplified, partially sectioned side view of a pivot joint of FIG. 1 and FIG. 2.

FIG. 2 shows by way of example in a simplified manner the electric motor 19 which is associated with the pivot joints 14A, 14B between the front roof element 6 and the middle roof element 7 and which, like the other electric motors, is connected by means of flexible shafts 23 in each case to both pivot joints 14A, 14B disposed oppositely with respect to the longitudinal axis of the vehicle.

The electric motors 18 to 22 shown are each made as DC motors and are arranged centrally with respect to the longitudinal axis of the vehicle. However, in another version, a decentralized arrangement of an electric motor and its connection with only one pivot axle is provided.

The pivot joints 14A, 14B each have a transmission device 24 which is made as a reduction gear and by means of which they are connected to the respective electric motor 19 and are shown in more detail in FIG. 3 to FIG. 6.

The transmission device 24 is arranged between a lever or a roof frame part 3 of the front roof element 6 and a lever or roof frame part 4 of the middle roof element 7, with the lever 4 of the middle roof frame part 7 being made in the form of a shell in the region of the transmission device 24 and forming a bearing shell 31 for a sleeve coupling with a shell part 30 arranged between the lever 4 and the lever 3 of the front roof element.

Figure 4:
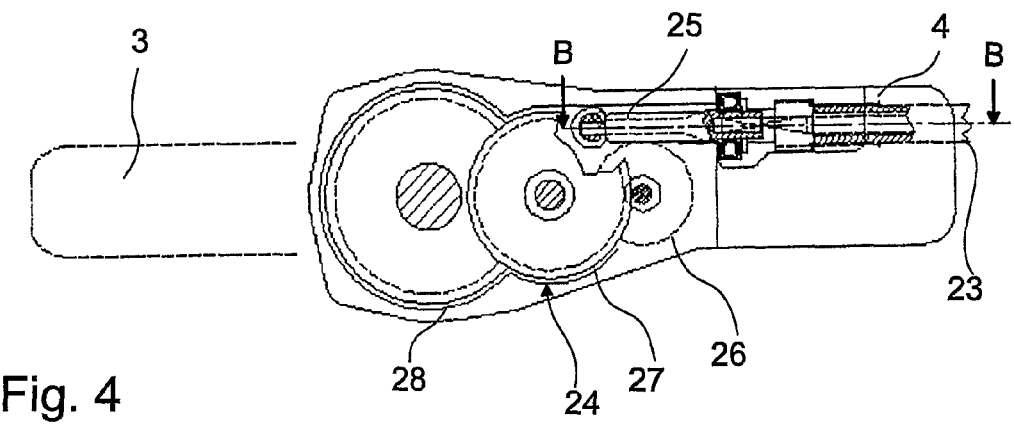
FIG. 4 is a further partially sectioned side view of the pivot joint of FIG. 3.
Figure 5:
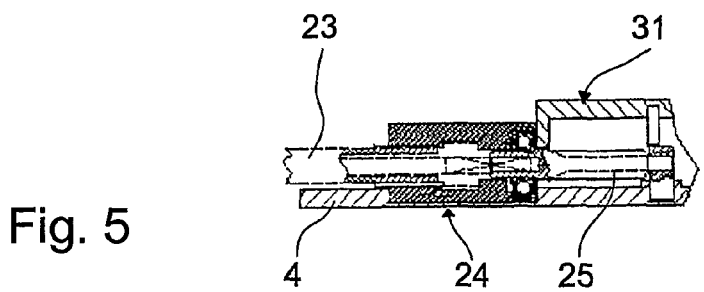
FIG. 5 is a section through the pivot joint of FIG. 3 and FIG. 4 along a line A-A in FIG. 3.
Figure 6:
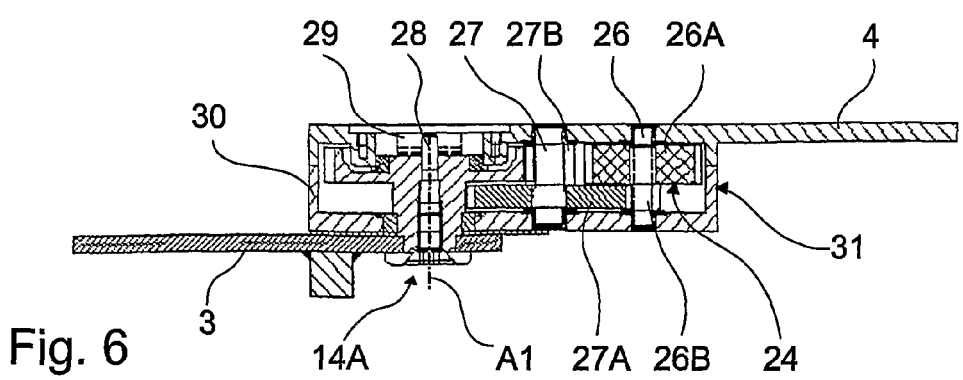
FIG. 6 is a section through the pivot joint of FIG. 3 and FIG. 4 along a line B-B in FIG. 4.

As shown in FIG. 4 and FIG. 5, the flexible shaft 23 is rotatably connected to a screw 25 of the transmission device 24 supported at the lever 4 of the middle roof element 7. The screw 25 is in engagement with a first gear 26 which is made of plastic for noise reasons in the present case and which is made in staged manner with a first gear stage 26A which is in engagement with the screw 25 and a second gear stage 26B of a smaller diameter. The second gear stage 26B is in engagement with a second gear 27 or a first gear stage 27A of the same whose diameter is larger than the first gear stage 26A of the first gear 26. Both the first gear 26 and the second gear 27 are supported at both ends in the bearing shell 31.

The second gear 27 meshes via a second gear stage 27B, which is smaller than the first gear stage 27A of the second gear 27, but larger than the second gear stage 26B of the first gear 26, with a third gear 28 whose axle forms the first pivot axle A1 and is rotatably fixedly connected to the lever 3 of the front roof part 6.

A self-locking of the transmission device 24 is achieved via the design of the pitch of the screw 25 in the embodiment shown. In addition or alternatively, this effect can also be achieved with brakes on the electric motors 18 to 22.

The roof element 6, 7, or their levers 3, 4, connected by the pivot joints 14A, 14B are rotatable at least approximately by 360° with respect to one another, with an abutment 32 adjustable by means of a regulating screw 33 being provided at the pivot joint 14A or 14B respectively.

As with the other pivot joints, a position detection sensor 29 is arranged at the pivot joint 14A or 14B respectively for the determination of the position of the top 2 or of its roof elements, with the position detection sensor 29 being made as a potentiometer in this present case.

The position detection sensor 29 in the embodiment shown is placed in a simple manner onto a striker which is provided coaxially to the respective pivot axle in the transmission device of the respective pivot joint.

Alternatively to a position recognition by means of a potentiometer, other analog and digital systems can naturally also be used such as incremental transducers, inclination sensors or Hall sensors.

Figure 7:
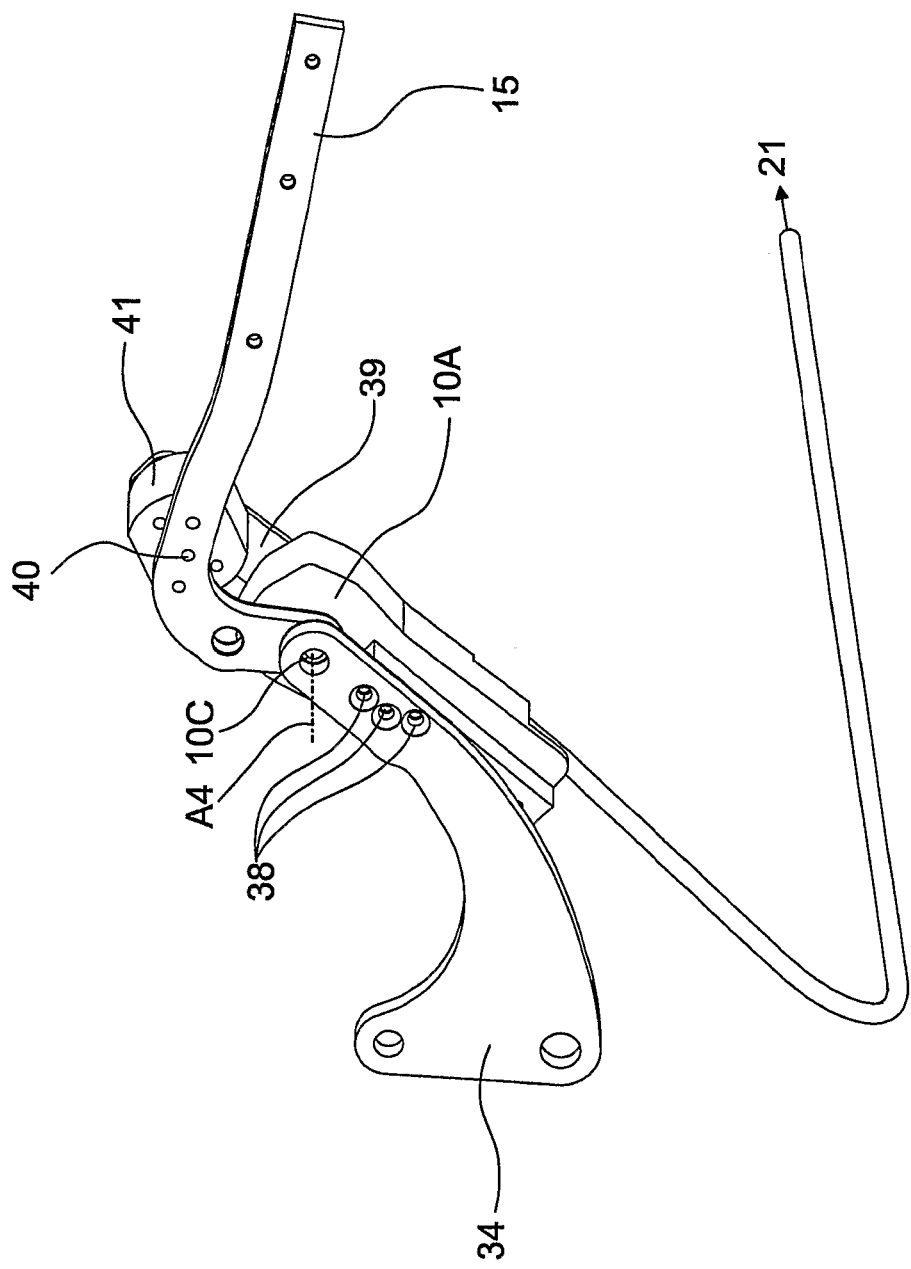
FIG. 7 is a simplified three-dimensional representation of a connection of a clip of the top of FIG. 1, shown alone.

The connection of the clamp 15 to the vehicle body 9 or to a lever element 34 connected thereto is shown in an enlarged representation on its own in FIG. 7. Unlike the connections of the roof elements 6, 7, 8 to one another and their connection to the vehicle body 9 and the connection of the top storage well cover 16 to the vehicle body 9, not only directly driven active pivot joints are used here whose pivot axle is also the pivot axle A1, A2, A3, A5 of the associated connection.

The connection of the clamp 15 to the vehicle body 9 or to the lever element 34 is made both with active pivot joints 10A, 10B directly driven by the electric motor 21 and with two pairs of passive pivot joints 10C, 10D and 10E, 10F, with the passive pivot joints 10C, 10D, of which the pivot joint 10C can be seen in FIG. 7, forming the pivot axle A4 of the connection.

The active pivot joint 10A is secured to the lever element 34 connected to the vehicle body via screw connections 38 in the present case. The torque of the pivot joint 10A is transmitted via an auxiliary lever 39 to a bridging element 41 fixed via connections 40 to the clamp 15, and thus to the clamp 15. With such an aspect of the connection, the driven pivot joint 10A, or the pivot joint 10B forming the mirror image thereof, substantially only has to be designed for the required torque to be transmitted and not for further forces occurring at the hinge point.

Deviating from the embodiment shown in FIG. 1, further connections can naturally be designed between the top elements and in particular between the top elements and the vehicle body using active and passive pivot joints in accordance with the embodiment shown in FIG. 7.

With reference to FIG. 8.1 to FIG. 8.12, a movement sequence of the top 2 on an opening movement is shown in each case. In this context, FIG. 8.1 to FIG. 8.11 show an opening movement with trajectories such as are typical in conventional hydraulically driven tops.

In FIGS. 9.1 to 9.13, in contrast, a much shallower top movement which is possible in accordance with the inventive top is shown in which there is still sufficient headroom in the back of the vehicle for passengers located there.

FIG. 10.1 to FIG. 10.12 show a top opening movement with an even lower trajectory such as can be selected with a free rear region and which is optionally also possible during the journey of the vehicle since a very low area is exposed to the wind and so a very low drag can be realized with this opening movement.

With each of the top movements shown in FIG. 8.1 to FIG. 10.12, the three roof elements 6, 7, 8 can be folded in S-form such that the front roof element 6 is stowed in a folding position with an open top 2 rearwardly pivoted over the middle roof element 7 and the rear roof element 8 which lies below it and is likewise rearwardly pivoted with respect to its position with a closed top 2.

On an opening movement of the top 2, the clamp 15 is first raised for the release of an upwardly pivoting movement of the top storage well cover 16 and is lowered again after the putting up of the top storage well cover 16, after which the roof elements 6, 7, 8 are placed on the clamp 15.

The opening movement of the top 2 is controlled in each case in this process such that the front roof element 6 is pivoted upwardly and rearwardly around the first pivot axle A1, the middle roof element 7 is pivoted around its rear second pivot axle A2 and the rear roof element 8 is pivoted rearwardly around its rear third pivot axle A3.

In particular with reference to FIG. 8.1 to FIG. 8.11 representing a control with conventional trajectories of the roof elements 6, 7, 8, it can be seen that the upward and rear pivoting of the front roof element 6 at the first pivot axle A1 substantially takes place during the pivoting of the middle roof element 7 and of the rear roof element 8, with the rear roof element 8 being folded over rearwardly on a rearward movement of the second pivot axle A1 and the middle roof element 7 only changing its angular position insignificantly during the opening movement is placed on it.

A top movement is shown in FIG. 9.1 to 9.13 which is shallower with respect to the control in FIG. 8.1 to FIG. 8.11 and in which the pivoting or folding of the front roof element 6 around the first pivot axle A1 takes place upwardly and rearwardly essentially before the pivoting of the middle roof element 7 and of the rear roof element 8 in a manner in accordance with FIG. 8.1 to FIG. 8.11.

In FIG. 9.9 and FIG. 9.10 a front seat passenger 35 and a rear passenger 36 are shown in an elementary manner for whom sufficient space is present in the head region during this opening movement of the top 2.

The top opening movement shown in FIG. 10.1 to FIG. 10.12 differs from an opening movement shown in FIG. 9.1 to FIG. 9.13 by much shallower trajectories of the roof elements 6, 7, 8 which are in particular achieved in that the pivoting of the front roof element 6 around the first pivot axle A1 only takes place after a far-going rearward pivoting of the middle roof element 7 and of the rear roof element 8 or of the second pivot axle A1.

A control of this type takes place in the present case in dependence on the spacing determined via a distance recognition sensor system known per se from a height obstacle representing e.g. a garage ceiling 37 in accordance with FIG. 10.6 to FIG. 10.8. Due to the restricted height in the rear region here, this selection is only permitted if it is determined via a seat occupancy detection that there is no passenger 36 in the rear region.

A further advantageous top movement which can be realized with the top 2 in accordance with the invention is shown in FIG. 11.1 to FIG. 11.5.

On this opening movement of the top 2, the middle roof segment 7 is first pivoted around its rear second pivot axle A2 and the rear roof element 8 is pivoted around its rear third pivot axle A3, while the angular position of the front roof element 6 remains essentially the same. In an at least approximately horizontal position of the rear roof element 8 in accordance with FIG. 11.3, the front roof element 6 and the middle roof element 7 are placed down such that the middle roof element 7 is pivoted on the rear roof element 8 and at least approximately parallel thereto and the front roof element 6 is pivoted downwardly in respect to this into an at least approximately vertical position.

In this manner, the front roof element 6 can be placed in a space saving manner in the stowed position of the top 2 at least approximately parallel to a back of a rear seat.

FIGS. 12.1 to 12.3 show an alternative drive for the top storage cover 16 in an elementary illustration which can here at the same time be designed as a gate cover. The top storage well cover 16 is thus a cover element which can be raised from a closed position at least at one edge, such as at the edge 16A at the front side of a vehicle, by pivoting by means of drivable pivot joints 42, 43 and by means of an associated drive 22 around an oppositely disposed edge, here the rear edge 16B.

The drivable pivot joints 42, 43 here engage at a linkage 46 which is formed from two levers 47, 48, which is hingedly fixed at one end to the vehicle body 9 and is hingedly fixed at the other end to a region of the top storage well cover 16 disposed spaced from the pivot axle A5 of the top storage well cover 16 in the longitudinal direction of the vehicle.

In the embodiment shown, the connection of the linkage 46 of the first lever 47 to the vehicle body 9 and the connection of the levers 47 and 48 to one another is in each case formed as a drivable pivot joint 42 or 43 connected to an electric motor via a flexible shaft (not shown in any more detail), whereas the connection of the linkage 46 or of the second lever 48 to the top storage well cover 16 is designed as a passive pivot joint 44 of conventional construction.

Depending on the desired movement sequence and on the geometrical circumstances, it can also be advantageous to design the connection of the linkage 46 to the top storage well cover 16 with a drivable pivot joint.

The hinged connection of the top storage well cover 16 in the region of the pivot axle 5 to the rear edge 16B of the top storage well cover 16 is optional and made as a passive pivot joint 45 in the present case.

In particular with embodiment variants in which a further rear cover or trunk cover adjoins the top storage well cover 16 at the rear side, it is advantageous to design the hinged connection of the top storage well cover 16 in the region of its pivot axle A5 by means of a space-saving so-called swan-neck bearing which is curved between a hinged point and the fastening to the top storage well cover in the longitudinal direction of the vehicle such that it can move out of the way from an adjacent edge of a rear cover at the front side of the vehicle by pivoting. In this connection, the swan-neck bearing can also be arranged in a water passage.

When the top storage well cover 16 is moved from an open position as shown in FIG. 12.1 into a closed position as shown in FIG. 12.2, the top storage well cover 16 is lowered by a control of the pivot joint 42 fixedly supported on the vehicle and of the pivot joint 43 connecting the levers 47, 48 of the linkage 46 from an approximately vertical position into an approximately horizontal position, with a latching being able to be made available by a suitable locking element in the closed position shown in FIG. 12.2.

In the present embodiment, the levers 47, 48 of the linkage 46 are made in different lengths, whereby the linkage 46 can be brought into a type of dead center end position or can be moved into an over-center position. In the over-center position of the linkage 46 shown in FIG. 12.3 in which the joint 43 connecting the levers 47, 48 and the lever 48 hingedly connected to the top storage well cover 16 are positioned slightly in front of the pivot joint 43 fixing the linkage 46 to the vehicle body 9 in the direction of the front of the vehicle, a raising of the top storage well cover 16 from outside is not possible so that a latching of the top storage well cover 16 is realized without any further closing elements.

To precisely define the position of the linkage 46 in this latched position, an abutment 49 is provided which the linkage 46 comes into contact with in the latched position.

Alternatively to the over-center position shown in FIG. 12.3, in another embodiment, the abutment 49 can optionally be positioned so that the linkage 46 is located in a dead-center position.

To permit an emergency actuation in the event of a power failure, the drivable pivot joints 42, 43 are designed with respect to their self-locking such that they are manually adjustable in the deactivated state. The self-locking of the pivot joints 42, 43 is thus defined such that it, on the one hand, permits an adjustment by hand, but, on the other hand, is sufficient to hold the cover element 16 in its end position.

For the emergency unlatching, the linkage 46, as shown by dashed lines in FIG. 12.3, can be pivoted rearwardly to release the top storage well cover 16 for a manual opening.

The access possibility can here be realized by a through-hole at the side of the inner side of the vehicle in the embodiment shown or, in an embodiment with an adjacent rear cover and an adjacent trunk at the rear side, at the side of the trunk.

It is understood that, in addition to an emergency unlatching, an emergency latching is also possible with an oppositely directed manual actuation of the linkage 46.

The drivable pivot joints 42, 43 used in the embodiment in accordance with FIGS. 12.1 to 12.3 correspond in the present case to the pivot joints used in the previously described embodiments.

All the drivable pivot joints used in connection with the present invention cannot only be hinge-like swivel-pivot joints shown here, but also any other known joint type such as a ball joint which can in particular be advantageous on a pivoting of an external element of a vehicle in a transverse direction to the vehicle.

REFERENCE NUMERAL LIST 1 top
2 convertible vehicle
3 outer roof frame section pair
4 outer roof frame section pair
5 outer roof frame section pair
6 external element of a vehicle, top element, front roof element
7 external element of a vehicle, top element, middle roof element
8 external element of a vehicle, top element, rear roof element
9 vehicle body, main bearing
10A pivot joint
10B pivot joint
10C passive pivot joint
10D passive pivot joint
10E passive pivot joint
10F passive pivot joint
11A pivot joint
11B pivot joint
12 windshield frame
13A pivot joint
13B pivot joint
14A pivot joint
14B pivot joint
15 external element of a vehicle, top element, clamp
16 external element of a vehicle, top element, top storage well cover
16A edge
16B edge
17A pivot joint 17B pivot joint
18 electric motor
19 electric motor
20 electric motor
21 electric motor
22 electric motor
23 flexible shaft
24 transmission device
25 screw
26 gear
26A gear stage
26B gear stage
27 gear
27A gear stage
27B gear stage
28 gear
29 position detection sensor
30 shell part
31 bearing shell
32 abutment
33 regulating screw
34 lever element
35 front seat passenger
36 rear seat passenger
37 height obstacle, garage ceiling
38 screw connection
39 auxiliary lever
40 connection
41 bridging element
42 pivot joint
43 pivot joint
44 pivot joint
45 pivot joint
46 linkage
47 lever
48 lever
49 abutment
A1 pivot axle
A2 pivot axle
A3 pivot axle
A4 pivot axle
A5 pivot axle

The invention claimed is:

1. A convertible top system for a convertible vehicle having a vehicle body, the system comprising:
a plurality of pivotable external top elements, the top elements including foldable roof elements that extend over a passenger compartment of the vehicle when the foldable roof elements are in a closed position;
a plurality of pivot joints providing pivotable connections between the plurality of external top elements and between at least one of the top elements and the vehicle body, at least one roof element being pivotably connected to the vehicle body with at least one of the pivot joints; and
at least one drive including an electric motor operable to pivot one of the roof elements with respect to another of the roof elements, the electric motor introducing a drive torque directly into the pivot joint connecting the two roof elements;
wherein at least some of the pivot joints are independently controllable.

2. The convertible top system according to claim 1, further comprising:
a flexible shaft interconnecting the electric motor with the one of the pivot joints for directly introducing drive torque into the pivot joint.

3. The convertible top system according to claim 2, wherein:
the plurality of pivot joints includes at least two pivot joints oppositely disposed with respect to a longitudinal axis of a vehicle;
a flexible shaft interconnecting the electric motor with the two joints for directly introducing drive torque into each of the two joints.

4. The convertible top system according to claim 1, wherein:
at least some of a plurality of pivot joints are made of the same construction.

5. The convertible top system according to claim 1, wherein:
one of the pivot joints is driven by means of a transmission device, with the transmission device being arranged between a lever associated with a first external element and a further lever of a second external element of a vehicle.

6. The convertible top system according to claim 5, wherein the transmission device includes a screw, the system further comprising:
a first gear supported at one of the levers;
a second gear engaged with the first gear;
a flexible shaft rotatably transmitting the torque of the electric motor to the screw of the transmission device; and
said screw being in engagement with the first gear.

7. The convertible top system according to claim 1, further comprising:
a position detection sensor arranged at one of the pivot joints.

8. The convertible top system according to claim 7, wherein
the position detection sensor comprises a potentiometer
a striker being provided in a transmission device of the pivot joint coaxially to a pivot axle of the joint, the potentiometer being disposed on said striker.

9. The convertible top system according to claim 1, further comprising:
an adjustable abutment with a regulating screw provided at one of the pivot joints.

10. The convertible top system according to claim 1, wherein:
at least one of the pivot joints is rotatable by at least approximately 360°.

11. The convertible top system according to claim 1, further comprising:
an electric motor associated with each pivotable connection between the top elements and to the vehicle body.

12. The convertible top system according to claim 1, wherein:
the pivotable connections between the top elements and to the vehicle body are each formed by at least one controllable pivot joint and by at least one passive pivot joint, with an associated pivot axle of the pivotable connection being a pivot axle of the passive pivot joint.

13. The convertible top system according to claim 1, further comprising:
a central electrical control unit; and
a plurality of electric motors each connected to the central electrical control unit.

14. The convertible top system according to claim 13, wherein:
each electric motor has a control unit, each control unit being connected by a data bus to the central control unit.

15. The convertible top system according to claim 1, wherein:
the foldable roof elements include three roof elements which can be folded together in an S-shape such that a front one of the roof elements is stowed in a folding position rearwardly pivoted over a middle one of the roof elements, a rear one of the roof elements lying below the front roof element in the folding position and is rearwardly pivoted with respect to its position with a closed top;
wherein on an opening movement of the top, the front roof element is pivoted upwardly and rearwardly around a first pivot axle, the middle roof element is pivoted around a rear second pivot axle and the rear roof element is pivoted rearwardly around a rear third pivot axle, with the pivoting of the front roof element selectively taking place substantially before the pivoting of the middle roof element and of the rear roof element.

16. The convertible top system according to claim 1, wherein:
the external top elements include a clamp and a top storage well cover;
on an opening movement of the top, the clamp is first raised for the release of a upwardly pivoting movement of the top storage well cover and is lowered again after the putting up of the top storage well cover, after which the roof elements are placed on the clamp.

17. The convertible top system according to claim 1, wherein:
the foldable roof elements include three roof elements which can be folded such that, on an opening movement of the top, a middle one of the roof elements is first pivoted around a rear pivot axle and a rear one of the roof elements is pivoted rearwardly around a rear pivot axle; and, in an at least approximately horizontal position of the rear roof element, a front one of the roof elements and the middle roof element are placed down such that the middle roof element is pivoted on the rear roof element and at least approximately parallel thereto and the front roof element is pivoted downwardly in respect to this into an at least approximately vertical position.

18. The convertible top system according to claim 1, wherein:
the external top elements include a top storage well cover; and
on an opening movement of the top, the top storage well cover is first pivoted upwardly and, in a stowage position of the roof elements is pivoted downwardly into an at least approximately horizontal position.

19. The convertible top system according to claim 1, wherein:
at least one external element is a top storage well cover or a gate cover, which can be raised from a closed position at least at one edge by pivoting by means of at least one drivable pivot joint and at least one associated drive around an oppositely disposed edge.

20. The convertible top system according to claim 19, wherein:
the at least one drivable pivot joint engages at a linkage which is hingedly fixed at one end to the vehicle body and is hingedly fixed at the other end to a region of the cover disposed in the longitudinal direction of the vehicle spaced from a pivot axle of the cover, with the linkage being formed from two mutually connected levers having different lengths and with a connection of the levers to one another and at least one of the hinged connections to the cover or to the vehicle body being formed with a drivable pivot joint.

21. The convertible top system according to claim 20, wherein:
the cover is latchable in its closed position by pivoting the linkage into a dead-center position or over-center position.

22. The convertible top system according to claim 20, wherein:
the at least one drivable pivot joint is designed manually adjustably for emergency activation in the deactivated state.

23. The convertible top system according to claim 20, wherein:
the cover is fixed to the vehicle body at the edge associated with its pivot axle by means of at least one passive pivot joint.

24. The convertible top system according to claim 1, wherein:
the foldable roof elements include three roof elements which can be folded together in an S-shape such that a front one of the roof elements is stowed in a folding position rearwardly pivoted over a middle one of the roof elements, a rear one of the roof elements lying below the front roof element in the folding position and is rearwardly pivoted with respect to its position with a closed top;
wherein on an opening movement of the top, the front roof element is pivoted upwardly and rearwardly around a first pivot axle, the middle roof element is pivoted around a rear second pivot axle and the rear roof element is pivoted rearwardly around a rear third pivot axle, with the pivoting of the front roof element selectively taking place substantially during the pivoting of the middle roof element and of the rear roof element.

25. The convertible top system according to claim 1, wherein:
the foldable roof elements include three roof elements which can be folded together in an S- shape such that a front one of the roof elements is stowed in a folding position rearwardly pivoted over a middle one of the roof elements, a rear one of the roof elements lying below the front roof element in the folding position and is rearwardly pivoted with respect to its position with a closed top;
wherein on an opening movement of the top, the front roof element is pivoted upwardly and rearwardly around a first pivot axle, the middle roof element is pivoted around a rear second pivot axle and the rear roof element is pivoted rearwardly around a rear third pivot axle, with the pivoting of the front roof element selectively taking place substantially after the pivoting of the middle roof element and of the rear roof element.

26. A convertible top system for a convertible vehicle having a vehicle body, the system comprising:
a plurality of pivotable external top elements, the external top elements including foldable roof elements, a first one of the external top elements including a lever and a second one of the external top elements including a further lever, a first gear supported at one of the levers and a second gear engaged with the first gear;
a plurality of pivot joints providing pivotable connections between the plurality of external top elements and between at least some of the top elements and the vehicle body, at least one roof element being pivotably connected to the vehicle body with at least one of the pivot joints; and at least one drive for pivoting the at least one roof element with respect to another roof element or with respect to the vehicle body, the at least one drive being an electric motor, the electric motor introducing a drive torque directly into one of the pivot joints;

a transmission device driving one of the pivot joints, the transmission device including a screw, the screw being in engagement with the first gear;

a flexible shaft rotatably transmitting the torque of the electric motor to the screw of the transmission device;

wherein at least some of the pivot joints are independently controllable.

27. A convertible top system for a convertible vehicle having a vehicle body, the system comprising:

a plurality of pivotable external top elements, the top elements including foldable roof elements;

a plurality of pivot joints providing pivotable connections between the plurality of external top elements and between at least some of the top elements and the vehicle body, at least one roof element being pivotably connected to the vehicle body with at least one of the pivot joints, an adjustable abutment with a regulating screw provided at one of the pivot joints; and at least one drive for pivoting the at least one roof element with respect to another roof element or with respect to the vehicle body, the at least one drive being an electric motor, the electric motor introducing a drive torque directly into one of the pivot joints;

wherein at least some of the pivot joints are separately controllable.

28. A convertible top system for a convertible vehicle having a vehicle body, the system comprising:

a plurality of pivotable external top elements, the top elements including foldable roof elements;

a plurality of pivot joints providing pivotable connections between the plurality of external top elements and between at least some of the top elements and the vehicle body, at least one roof element being pivotably connected to the vehicle body with at least one of the pivot joints, at least one of the pivot joints being rotatable by at least approximately 360°; and at least one drive for pivoting the at least one roof element with respect to another roof element or with respect to the vehicle body, the at least one drive being an electric motor, the electric motor introducing a drive torque directly into one of the pivot joints;

wherein at least some of the pivot joints are separately controllable.

29. A convertible top system for a convertible vehicle having a vehicle body, the system comprising:

a plurality of pivotable external top elements, the top elements including. foldable roof elements, a clamp and a top storage well cover;

a plurality of pivot joints providing pivotable connections between the plurality of external top elements and between at least some of the top elements and the vehicle body, at least one roof element being pivotably connected to the vehicle body with at least one of the pivot joints; and at least one drive for pivoting the at least one roof element with respect to another roof element or with respect to the vehicle body, the at least one drive being an electric motor, the electric motor introducing a drive torque directly into one of the pivot joints;

wherein at least some of the pivot joints are separately controllable; and wherein on an opening movement of the top, the clamp is first raised for the release of a upwardly pivoting movement of the top storage well cover and is lowered again after the putting up of the top storage well cover, after which the roof elements are placed on the clamp.

* * * * *